This application is a division of my copending application Serial No. 29,102, filed May 13, 1960 (now abandoned).

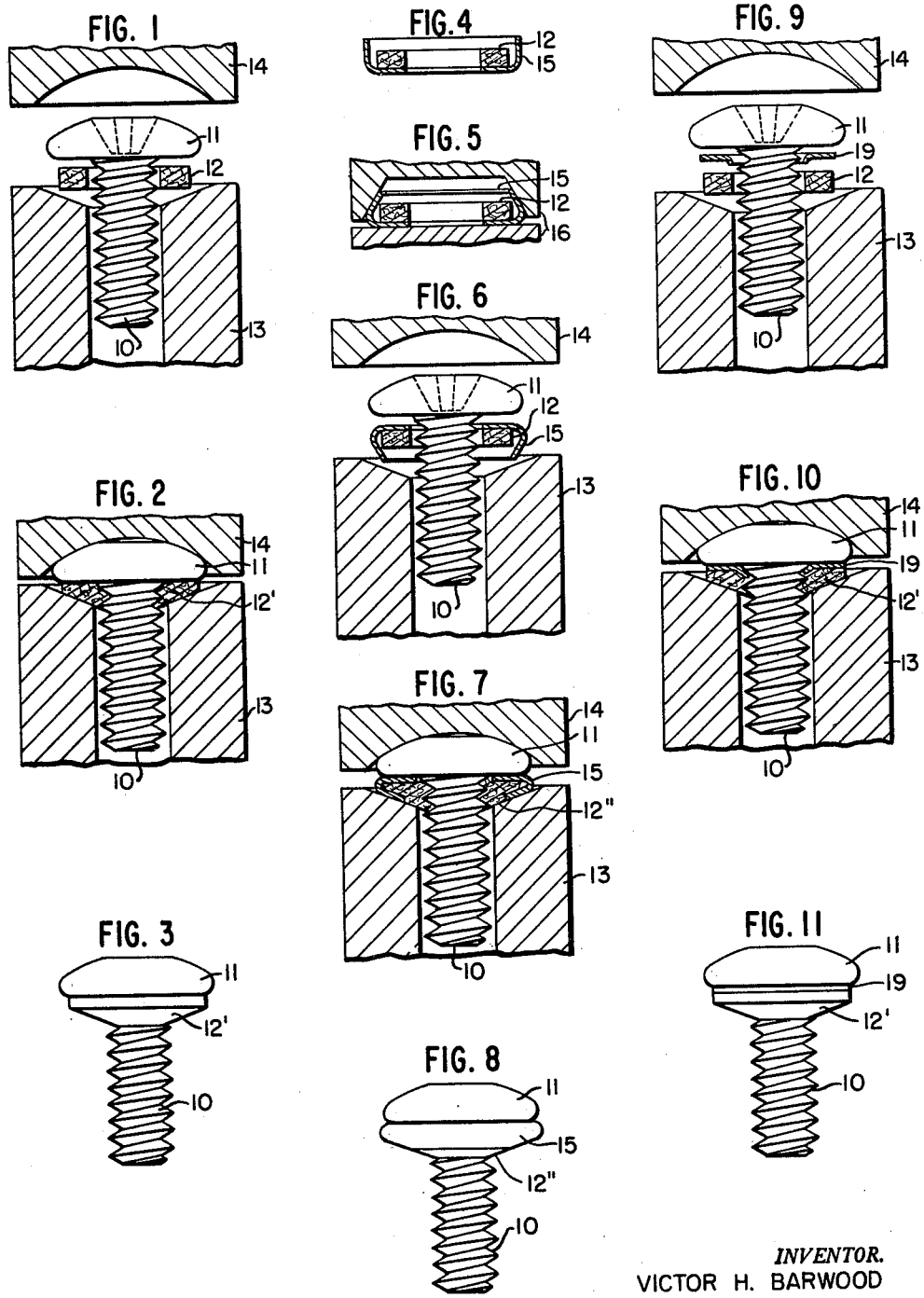
May 25, 1965     V. H. BARWOOD     3,184,769
METHOD OF ASSEMBLING SEALING WASHER AND HEADED FASTENER
Original Filed May 13, 1960
INVENTOR.
VICTOR H. BARWOOD
ATTORNEYS 3,184,769
METHOD OF ASSEMBLING SEALING WASHER
AND HEADED FASTENER
Victor H. Barwood, 400 Commonwealth Ave.,
Boston, Mass.
Original application May 13, 1960, Ser. No. 29,102.
Divided and this application May 21, 1963, Ser. No.
285,184
3 Claims. (Cl. 10—10)

This invention comprises a new and improved process of making a preassembled threaded fastener having provision therein for making a cushion or sealed joint by exposing beneath the head of the fastener a conical body of sealing material for direct contact with the member to be fastened.

One important field of use for the fastener is in uniting sheet metal members having an enamel finish which is somewhat brittle and so requires a fastener having a cushion action. In the same category is the problem of uniting glass plates or sheets of translucent synthetic resin now used in the building trade. The fastener herein shown advantageously meets these requirements by including a body or washer of flowable and cushioning material where it is located contiguous to and beneath the head of the fastener in interlocked engagement with the thread of the shank, and having a concentric conical and partially enclosed contour. The sealing material is exposed in a conical band converging outwardly away from the head of the fastener.

The compressible component of the washer may be fibrous such as asbestos, or it may be a polyester resinous compound such as "Teflon" that is flowable under pressure to the extent of forming a sealed joint.

The cushion or sealing component of the washer may be partially enclosed or clad with a metal and exposed in a ring between the shank of the fastener and a partially enclosing shell. As herein shown, the compressible component may be partially enclosed within a metal shell and swaged therein against the head of the fastener causing both the inner portion of the shell and the compressible component to become interlocked with the thread of the fastener and to assume an attractive concentric conical contour.

These and other features of the invention will be best understood and appreciated from the following description of several preferred embodiments of the invention selected for purposes of illustration and shown in the accompanying drawings, in which:

FIGS. 1 and 2 are fragmentary cross-sectional views suggesting the swaging step in producing a headed screw having a cushion washer, FIG. 3 is a view in elevation of the complete product, FIGS. 4, 5, 6 and 7 are fragmentary views suggesting the steps of assembling the parts of a composite cushion washer, and swaging them into place beneath the head of a screw, FIG. 8 is a view in elevation of the product produced in accordance with the steps of FIGS. 4–7, FIGS. 9 and 10 are sectional views suggesting the formation of a cushion or sealing fastener of modified construction, and FIG. 11 is a view in elevation of the product produced in accordance with the steps of FIGS. 9 and 10.

The steps of producing a fastener adapted for the formation of a cushion joint are indicated in FIGS. 1 and 2 wherein a screw having a threaded shank 10 and a round head is shown in association with cooperating swaging dies 13 and 14. The bore of the lower die 13 is such as to receive with clearance the threaded shank 10 of the screw, and at its upper end the bore opens into a countersunk recess of conical contour and an included angle of approximately 140°. The upper die 14 has a concentric concavity of spherical contour shaped to fit the screw head.

Before placing the screw in the lower die 13 a loosely fitting cushion ring or washer 12 of asbestos fiber, or other flexible compressible, fibrous material, is placed upon the shank 10. The screw and washer are then subjected to swaging action between the dies, and the cushion ring 12 is swaged into interlocking engagement with the threads of the shank 10 and into the concentric conical formation indicated by reference character 12'. The cushion screw shown in FIG. 3 is thus produced as an article of commerce of which the cushion washer 12' is a permanent part.

In making the cushion or sealing washer and fastener of FIGS. 4–8, the same or similar upper and lower dies 13 and 14 as those of FIGS. 1 and 2 are employed. The loosely fitting cushion washer 12 is first placed within a perforated cup-shaped shell 15. The shell 15 is then partially crimped by having its upstanding walls closed inwardly sufficient to retain the washer 12 within the shell and this may be effected by cooperating dies 16. The washer 12, partially enclosed within the shell 15, is next assembled upon the threaded shank 10 of the screw and then the parts are placed between upper and lower dies 13 and 14 as indicated in FIG. 6. In the ensuing swaging operation, the shell 15 is somewhat flattened and its walls are forced into concentric conical configuration while the cushion washer is forced into interlocking engagement with the threads of the shank 10. In this step, the inner portion of the cushion washer, now designated at 12'', is exposed in an annular zone adjacent to the shank 10 and forms a smooth continuous surface with the rim of the outer wall of the shell 15 which lies in flush relation with the exposed surface of the washer. The enclosed washer remains a permanent part of the cushion fastener shown in FIG. 8 and protrudes outwardly beyond the shell 15 in position to make cushioning contact on the surface of the element being fastened when the fastener is screwed home.

If it is desired to provide a fastener adapted to form a sealed joint, or a cushioning and sealing joint, the ring or washer 12 may be formed of Teflon, or other synthetic resinous product adapted to be extruded to some extent when the screw is turned home in its final position.

The swaging die 14 has a cavity fitting the top of the screw head. The lower die 13 has a conical recess for shaping the shell 15 and the washer 12 and a concentric bore into which extends the threaded shank of the screw with substantial clearance for its threads.

The modified cushioning or sealing fastener of FIGS. 9–11 is formed with the same swaging dies 13 and 14 as those previously described. In this instance, a flat perforated disc 19, having an inner upstanding flange, is placed on the threaded shank 10 beneath the screw head 11, and the loosely fitting cushion or sealing washer 12 is placed on the shank 10 beneath the disc 19. In the swaging operation indicated in FIG. 10, the flange of the disc 19 is forced into interlocking engagement with the threads of the shank 10. The cushion or sealing ring is also forced into interlocking engagement with the shank and given a concentric conical or convex configuration indicated by reference character 12' in FIGS. 10 and 11. In this instance, the rim of the flat disc 19 is visible between the swaged ring 12' and the head 11 of the screw. The material of the ring 12' may be any suitable flowable and moldable composition, either fibrous, as asbestos, or metallic such as soft copper or aluminum.

In still another phase my invention may be applied with great advantage to the production of a unit bolt-and-washer fastener wherein it is desired to provide a bolt or screw permanently equipped or preassembled with a surrounding washer ready for immediate use as a unit, whether or not the joint made by the fastener is to be of the sealing type. FIGS. 9–11 suggest the steps in providing such a unit where the disc 19 may take the form of a hard metal washer with either an outer or an inner flange or a plain rim, and the swaged component 12' may be soft flowable metal such as copper or aluminum, or asbestos. The metal washer also may if desired be of greater diameter than the bolt head. For example, both the bolt and the washer may be of hardened steel in a unit particularly useful in automobile body work. The compressible washer 12, on the other hand, is confined entirely within and beneath the periphery of the screw head.

Having thus disclosed my invention and described in detail several illustrative examples thereof, I claim as new and desire to secure by Letters Patent:

1. The process of making pre-assembled sealing fasteners, comprising the steps of assembling a loose fitting washer of compressible flowable sealing material in a metallic shell having an upstanding outer flange, bending the flange inwardly sufficiently to hold the washer in place in the shell, encircling the threaded shank of a headed fastener with the assembled shell and washer, and then, with a countersunk die, swaging them both into conical formation against the head of the fastener causing the sealing material of the washer to become interlocked with the thread of the shank and the shell partially to cover the conformed washer in conical formation while exposing a conical zone for direct contact with a member to be secured by the fastener.

2. The process of making pre-assembled sealing fasteners, comprising the steps of encircling the threaded shank of headed screw with a loose fitting washer of compressible and flowable sealing material and a perforated disk having an inner upstanding flange, and then swaging the washer and disk against the head of the fastener causing them both to become interlocked with the thread of the shank and the washer to expose a concentric conical contour for direct contact with a member to be secured by the fastener, while the threaded shank of the fastener extends into free space.

3. The process of making pre-assembled sealing fasteners, comprising the steps of assembling a loose fitting washer of resinous sealing material within a perforated metallic shell having upstanding cylindrical walls, crimping the walls inwardly sufficiently to retain the washer within the shell, encircling the threaded shank of a screw with the assembled shell and washer and then swaging them with a conically recessed die thereby forcing both the shell wall and washer into engagement with the threads of the screw and imparting a smooth continuous conical shape to the exposed portions of the shell and also to expose a conical zone of the resinous sealing material for direct contact with a member to be secured by the fastener.

References Cited by the Examiner

UNITED STATES PATENTS

| | | |
|---|---|---|
| 1,103,847 | 7/14 | Schneider. |
| 1,515,996 | 11/24 | Buchanan. |
| 2,199,647 | 5/40 | Mueller et al. |
| 2,487,129 | 11/49 | Hallock _____ 29—511 |
| 3,009,176 | 11/61 | Knocke _____ 10—10 |

FOREIGN PATENTS 762   2/78   Great Britain.

ANDREW R. JUHASZ, *Primary Examiner.*